United States Patent [19]

Sklar

[11] Patent Number: 5,531,338
[45] Date of Patent: Jul. 2, 1996

[54] INFANT NURSING DEVICE

[76] Inventor: Jeffrey S. Sklar, 18 Brooks Rd., Wayland, Mass. 01778

[21] Appl. No.: 334,139

[22] Filed: Nov. 4, 1994

[51] Int. Cl.⁶ .................................................. A61J 9/00
[52] U.S. Cl. .................................... 215/11.1; 215/365
[58] Field of Search ............................ 215/365, 11.1, 215/11.2

[56] References Cited

U.S. PATENT DOCUMENTS

| Re. 12,097 | 3/1903 | McShane | 215/365 |
|---|---|---|---|
| D. 167,914 | 10/1951 | Taranton | 215/11.1 X |
| 388,677 | 8/1888 | Hayes | 215/365 |
| 864,674 | 8/1907 | McGlynn | 215/365 |
| 1,203,448 | 10/1916 | Ainsworth | 215/365 |
| 1,863,283 | 6/1932 | Rogers | 215/11.1 |
| 2,514,744 | 7/1950 | Cipyak | 215/11.1 |
| 2,843,281 | 7/1958 | Gallois | 215/11.1 |
| 3,028,983 | 4/1962 | Barr | 215/365 |
| 3,077,279 | 2/1963 | Mitchell | 215/11.1 |
| 3,139,064 | 6/1964 | Harle | 116/114 |
| 3,332,563 | 7/1967 | Reshan | 215/365 |
| 3,567,059 | 3/1971 | Littman | 215/11.2 |
| 3,645,413 | 2/1972 | Mitchell | 215/11.1 |
| 3,790,016 | 2/1974 | Kron | 215/11.1 |
| 4,293,083 | 10/1981 | Lussier | 222/158 |
| 4,293,084 | 10/1981 | Lussier | 215/365 X |
| 4,832,214 | 5/1989 | Schrader et al. | 215/11.1 |
| 5,263,599 | 11/1993 | Sklar | 215/11.1 |
| 5,316,160 | 5/1994 | Cautereels | 215/11.1 |

FOREIGN PATENT DOCUMENTS

| 0456160 | 11/1991 | European Pat. Off. | 215/11.1 |
|---|---|---|---|
| 1020296 | 2/1953 | France | 215/11.1 |
| 3145598 | 5/1983 | Germany | 215/11.1 |
| 60310 | 1/1939 | Norway | 215/365 |
| 422394 | 1/1935 | United Kingdom | 215/365 |

Primary Examiner—Sue A. Weaver
Attorney, Agent, or Firm—Hamilton, Brook, Smith & Reynolds

[57] ABSTRACT

A nursing device, as disclosed, includes a tubular container adapted for holding a liquid having a top end, a bottom end, and a longitudinal axis, wherein the container has a symmetrical, cross-sectional area substantially along the longitudinal axis. The nursing device also includes a nipple attached to the top end of the container and directional marker on the surface of the container for orienting the tubular container. The nursing device further includes a plurality of point markers located on the surface of the tubular container in space relationship from the top end of the tubular container and perpendicular to a plane formed by the longitudinal axis and directional marker.

9 Claims, 4 Drawing Sheets

INFANT NURSING DEVICE

BACKGROUND OF THE INVENTION

While feeding babies, particularly during the first months, feeding must be stopped at intervals in order to expel swallowed air. The problem with bottle feeding, which is well known to parents of infants, is that the bottle feeder must periodically interrupt the infants feeding and return the bottle to its upright position in order to determine the amount of fluid remaining in the bottle. As a result, feeding is needlessly interrupted several times. Such interruptions are, of course, undesirable, particularly since it is often difficult or impossible to get the infant to resume feeding thereafter.

With many baby bottles, the fluid level can only be read in the upright filling position (nipple facing skyward). These bottles have graduated markings on the side of the bottle from the bottom of the bottle that allows the feeder to measure the amount fluid left in the bottle while the bottle is upright.

Other bottles allow the fluid level to be read not only in the filling position but also in the feeding position. In addition to regular filling level markings spaced from the bottom of the bottle, these bottles have feeding level markings which permit the bottle feeder to read the amount of liquid remaining in the bottle during the feeding process without taking the nipple out of the baby's mouth. However, these bottles have a series of ellipses or partial ellipses circumscribing the bottle for indicating the level of the fluid in the bottle when held at predetermined angles. An example of this type of bottle is disclosed in U.S. Pat. No. 5,263,599, issued to Sklar on Nov. 23, 1993, the teachings of which are herein incorporated by reference. The bottle disclosed in this patent is assumed to be held at a low angle to the horizontal early during the feeding when the bottle is mostly full and is gradually raised to a more vertical and fully inverted position as the bottle is emptied. A disadvantage of this bottle is that an assumption is made as to the angle the bottle is held to the horizontal when a certain amount of fluid remains in the bottle. For instance, newborns may have the bottle held longer at a less comfortable and more steep angle to the horizontal, because regurgitation is more likely if any air is ingested. Whereas, an older baby may have a bottle held with the same amount of fluid at a more comfortable and more shallow angle to the horizontal. Further, different feeders hold a baby at different angles depending on the size of the baby and what position is most comfortable for the feeder. As a result, a series of bottles would have to be configured each with a different set of elliptical markings for different feeder and baby size combinations.

Therefore, a need exists for a nursing device, which overcomes the problems discussed above.

SUMMARY OF THE INVENTION

The present invention relates to a nursing device. The device includes a tubular container adapted for holding a liquid having a top end, a bottom end and a longitudinal axis, wherein the container has a symmetrical and uniform cross-sectional area substantially along a longitudinal axis. The device also has nursing means attached to the top end of the container with a directional marking means on the surface of the container for orienting the tubular container. The device further includes a plurality of point markings located on the surface of the tubular container in a spaced relationship from the top end of the tubular container and perpendicular to a plane formed by the longitudinal axis and directional marking means.

This invention has many advantages which include a device that allows accurate and quick reading from any point along the line segment formed by the point markers at essentially any angle while the bottle is inverted or semi-inverted. The device is easy to hold and to use and is not cluttered with a plurality of possibly confusing elliptical markings circumscribing the bottle.

DETAILED DESCRIPTION OF THE INVENTION

The features and other details of the apparatus of the invention will now be more particularly described with reference to the accompanying drawings and pointed out in the claims. The same numeral presented in different figures represents the same item. It will be understood that the particular embodiments of the invention are shown by way of illustration and not as limitations of the invention. The principal features of the invention can be employed in various embodiments without departing from the scope of the invention.

Figure 1A:
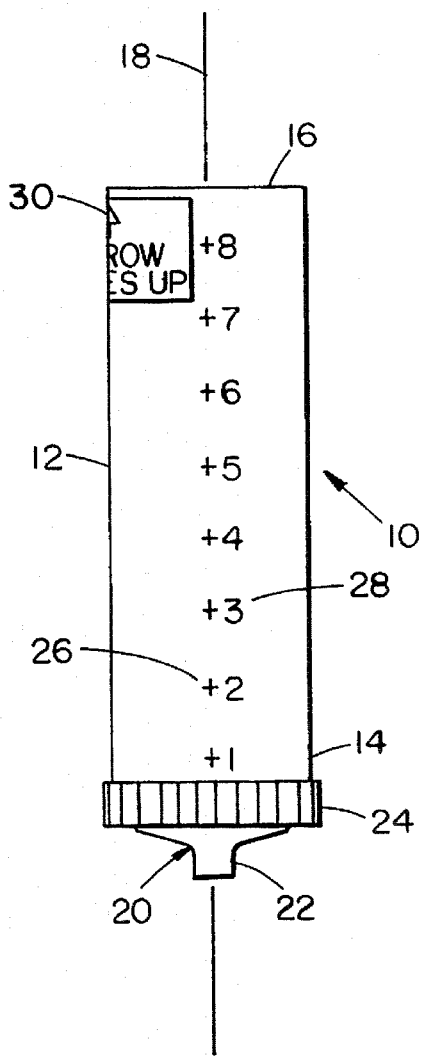
FIG. 1A is an orthogonal projection side view of one embodiment of the device of the present invention.
Figure 1B:
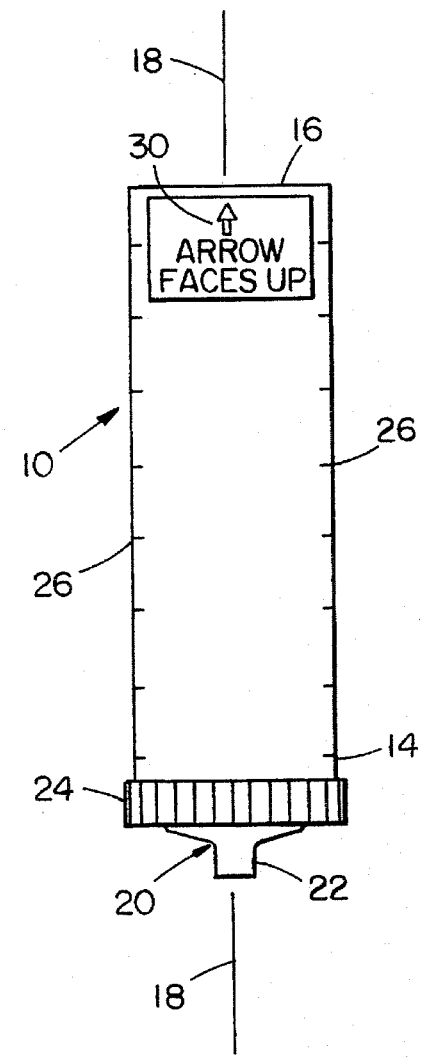
FIG. 1B is an orthogonal projection top view of the embodiment shown in FIG. 1A.

One embodiment of the invention, as shown in FIG. 1A, a side-view, and in FIG. 1B, a top view of the same embodiment, is nursing device 10. Nursing device 10 has bottle 12, which is generally tubular in its shape and is adapted for holding a liquid, such as baby formula or juice. Typically, bottle 12 is sized to hold a volume in the range of between about four and nine ounces. Bottle 12 has top end 14 that is opened and bottom end 16 that is closed. Bottle 12 further has longitudinal axis 18 wherein it has a symmetrical and uniform cross-sectional region substantially along and perpendicular to the longitudinal axis. For example, in one embodiment, bottle 12 is circular in shape, which has the same size and shape above and below the longitudinal axis. In other embodiments, bottle 12 is elliptical, hexagonal or octagonal in shape.

Bottle 12 is formed of a material that is either transparent or translucent so that the level of liquid contained therein is easily viewed from outside the container, such as glass, polyethylene or polypropylene. Only the portion of bottle 12 where the volume levels are viewed does the material need to be transparent or translucent.

Attached to top end 14 of bottle 12 is nursing means 20. Nursing means 20 has nipple 22, which can be formed of a synthetic rubber and is removably attached to bottle 12 in a conventional manner by collar 24. Specifically, nursing means 20 covers the open mouth of top end 14 of bottle 12 and projects outwardly therefrom. Collar 24 anchors nipple 22 while it couples bottle 12 adjacent to top end 14. The coupling of the collar 24 can be by means known in the art, such as threaded engagement, snap fit or other conventional means which forms a suitable seal. In one embodiment, top end 14 of bottle 12 has a neck that has a smaller area than the remaining substantially symmetrical and uniform cross-sectional area portion. This smaller neck allows coupling with nursing means 20 that has a smaller area than the remainder of bottle 12. Often the volume of fluid within the neck is only about an ounce.

Bottle 12 has a plurality of point markers 26 located on the surface of the bottle for indicating a point on the side of the bottle in spaced relationship from top end 14 of the bottle. In one embodiment, point markers 26 are spaced equidistantly denoting arithmetically increasing volume amounts. Point markers 26 are placed on bottle 12 by printing, screening, painting, etching, stickers or some other conventional means, or they can be formed on the container in the form of grooves or bumps on the inner or outer surface. Also, point markers 26 can include forms, such as a circle with a dot in the center, Xs, cross hairs, crosses or other means for indicating a point on the side of a bottle. In a preferred embodiment, point markers 26 are crosses. Each of the graduated point markers 26 can have corresponding indicia 28, such as for ounces or milliliters of fluid associated with it. Indicia 28 associated with the graduated markings have a lower value toward top end 14 of bottle 12 than indicia 28 at bottom end 16 of bottle 12 because indicia 28 are intended to be read while the bottle is inverted or semi-inverted during feeding.

Bottle 12 also includes directional marker means 30 for indicating which portion of bottle 12 should be held at the highest point while feeding. Directional marker means 30 is located on bottle 12 ninety degrees around the circumference of the bottle from point markers 26, wherein when the bottle is held in an inverted or semi-inverted position, the level of the fluid can cross one of point markers 26 indicating the level of the fluid. Point markers 26 can be on either one side or two sides of bottle 12. If the level of the fluid falls between two of the point markers, the volume can be interpolated based on the intersection of the fluid level and the line segment along which point markers 26 lie. Further, directional marking means 30 can have a notice stating that while reading the level of fluid in an inverted mode, the fluid should in full contact with top end 14 of bottle 12 and should not be in contact with bottom end 16 of bottle 12. This is because when these conditions are not satisfied the fluid level in bottle 12 is not fully accurate in indicating the volume of fluid but rather provides an approximate value. Point markers 26 on bottle 12 are either empirically derived or are calculated while taking into account the fluid volume inside nipple 22.

Figure 2A:
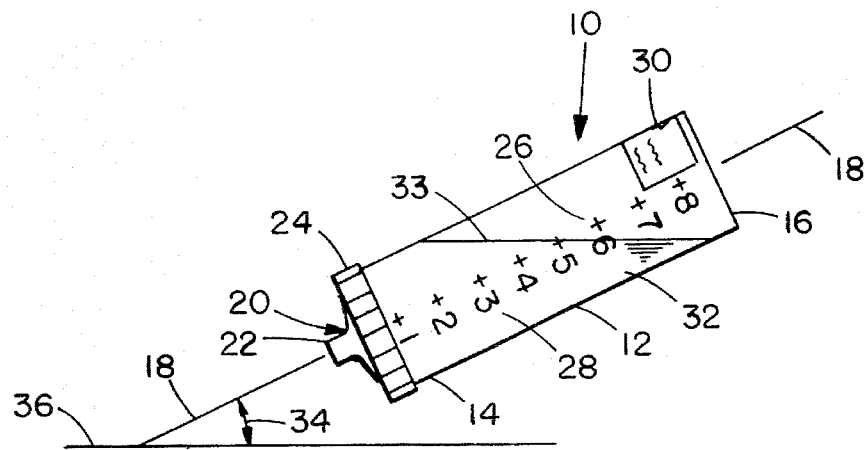
FIG. 2A is an orthogonal projection side view of the embodiment of the apparatus of the present invention shown in FIG. 1A in a tilted position from the horizontal for use.

As shown in FIG. 2A, bottle 12 is the same as the bottle disclosed in FIG. 1A and FIG. 1B, except that bottle 12 has been filled with five ounces of fluid 32 to fluid level 33 and inverted to first angle 34, about twenty-five degrees, to horizontal 36. Directional marking means 30 is oriented towards the highest point for raising bottom-end 16. As can be seen, point markers 26 and indicia 28 on bottle 12 indicate the number of ounces in the bottle. In this example, the number of ounces is five.

Figure 2B:
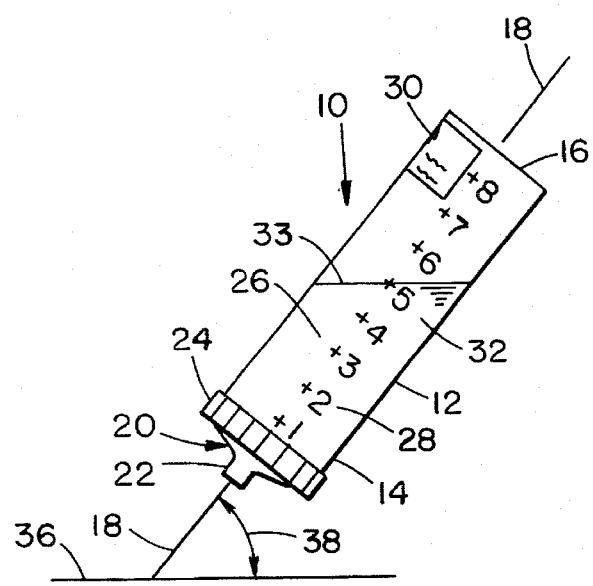
FIG. 2B is an orthogonal projection side view of the embodiment shown in FIG. 2A but at a steeper angle to the horizontal.
Figure 2C:
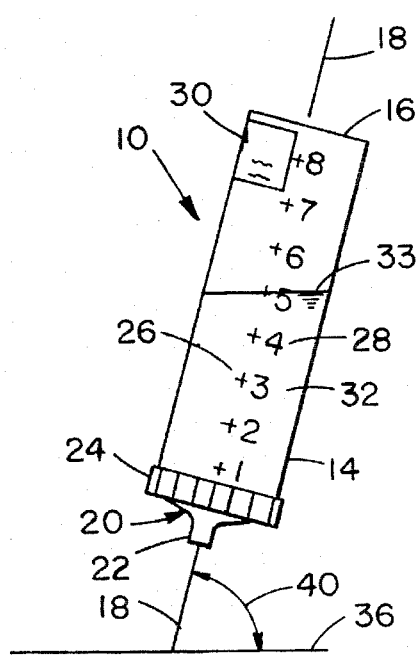
FIG. 2C is an orthogonal projection side view of the embodiment shown in FIGS. 2A and 2B but at a steeper angle to the horizontal than in either FIG. 2A or FIG. 2B.

As can be seen in FIG. 2B, bottle 12 with the same volume of fluid 32 is held at second angle 38, about fifty degrees, and can be easily read. Angle 38 is steeper to horizontal 36 than the first angle 34 shown in FIG. 2A. Also, shown in FIG. 2C is bottle 12, which is the same bottle that is shown FIGS. 2A and 2B but at third angle 40, about seventy-five degrees, which is steeper to horizontal 36 than first angle 34 and second angle 38 in the previous two figures. FIG. 2C has the same volume of fluid 32 as in the other two figures. As can be seen, point markers 26 and indicia 28 indicate the volume of fluid 32 remaining essentially regardless of the angle that bottle 12 is held. This is so long as fluid level 33 is fully in contact with the interior wall of bottle 12 in the symmetrical and uniform cross-sectional area region. However, if bottom end 16 is partially contacted by fluid 32 or fluid 32 is not fully touching top end 14, the measurement of the volume of fluid 32 is approximate rather than fully accurate.

Figure 3C:
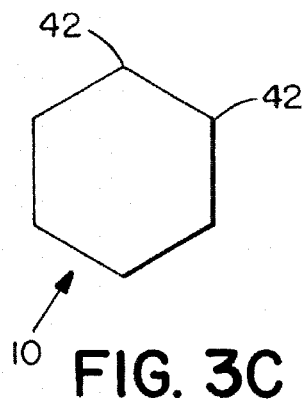
FIG. 3C is an orthogonal projection end view of the embodiment shown in FIG. 3A.
Figure 3D:
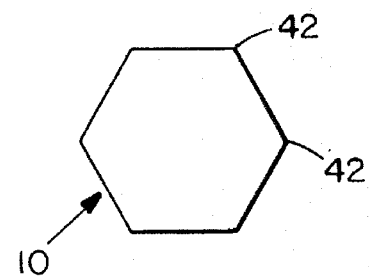
FIG. 3D is an orthogonal projection end view of the embodiment shown in FIG. 3B.
Figure 3A:
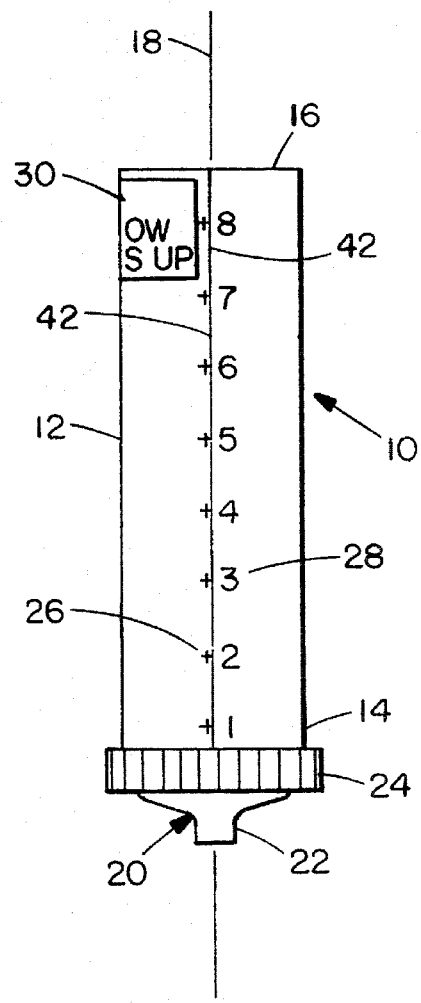
FIG. 3A is an orthogonal projection side view of another embodiment of the device of the present invention having a hexagonal shape.
Figure 3B:
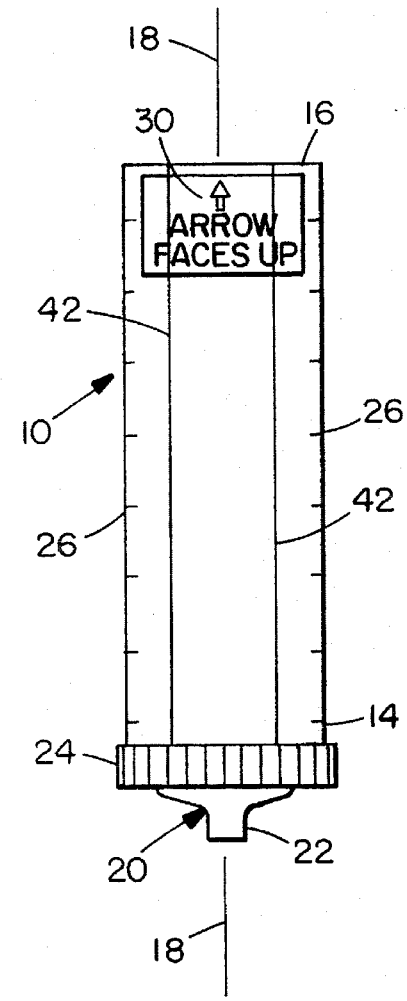
FIG. 3B is an orthogonal projection top view of the embodiment shown in FIG. 3A.

In FIGS. 3A, 3B, 3C and 3D, another embodiment of the invention is shown wherein the cross-sectional area of bottom end 16, shown in FIGS. 3C and 3D, is hexagonal in shape and forms corners 42.

Figure 4C:
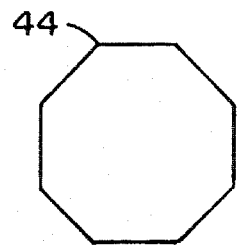
FIG. 4C is an orthogonal projection end view of the embodiment shown in FIG. 4A.
Figure 4D:
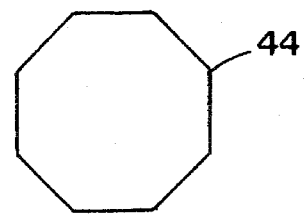
FIG. 4D is an orthogonal projection end view of the embodiment shown in FIG. 4B.
Figure 4A:
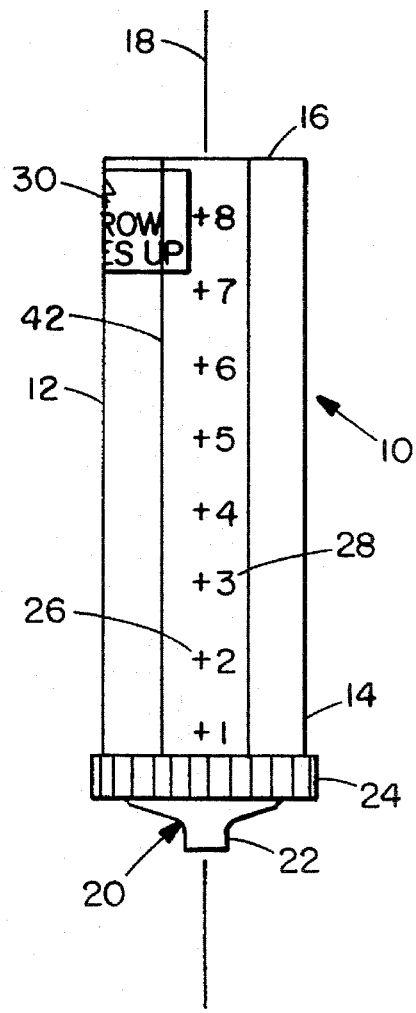
FIG. 4A is an orthogonal projection side view of a further embodiment of the device of the present invention having a octagonal shape.
Figure 4B:
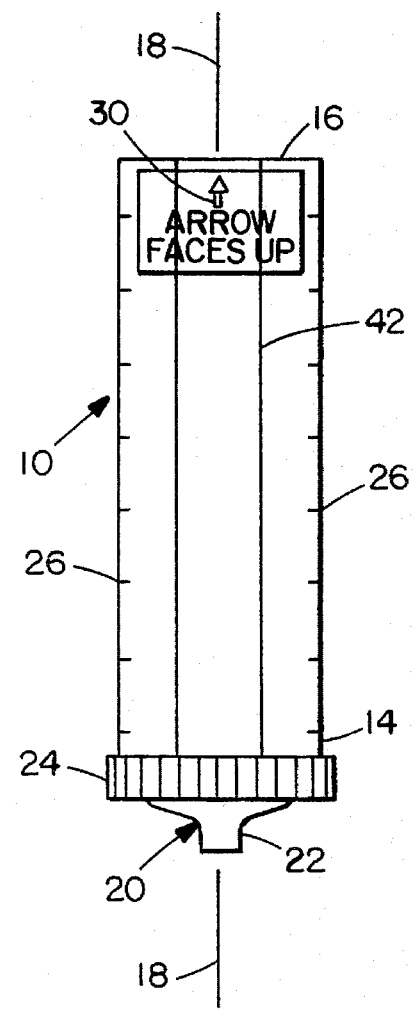
FIG. 4B is an orthogonal projection top view of the embodiment shown in FIG. 4A.

A further embodiment is shown in FIG. 4A, 4B, 4C and 4D. In this embodiment, the cross-sectional area of bottom end 16, shown in FIGS. 4C and 4D, is octagonal in shape and forms corners 44.

Equivalents

Those skilled in the art will recognize, or be able to ascertain using no more than routine experimentation, many equivalents to the specific embodiments of the invention described specifically herein. Such equivalents are intended to be encompassed in the scope of the claims.

What is claimed is:

1. A nursing device comprising:

a) a tubular container adapted for holding a liquid having a top end, a bottom end and a longitudinal axis, wherein said container has a symmetrical and uniform cross-sectional area substantially along the longitudinal axis;

b) nursing means attached to the top end of said container;

c) directional marking means on the surface of said container for orienting said tubular container to an inverted or semi-inverted position;

d) a plurality of point markers located on the surface of said tubular container in spaced relationship from the top end of said tubular container and in a first plane formed with the longitudinal axis and which is perpendicular to a second plane formed by the longitudinal axis and directional marking means;

e) indicia corresponding to the plurality of point markers, wherein said indicia have a lower value toward said top end of said container than the indicia at said bottom end of said container, for determining the volume of fluid in said container while said container is inverted or semi-inverted and at a plurality of angles to the horizontal.

2. The device of claim 1 wherein the tubular container has a circular cross-section along the longitudinal axis.

3. The device of claim 1 wherein the tubular container has a hexagonal cross-section along the longitudinal axis.

4. The device of claim 1 wherein the tubular container has an octagonal cross-section along the longitudinal axis.

5. The device of claim 1 wherein the tubular container includes a transparent material.

6. The device claim 1 wherein the tubular container includes a translucent material.

7. The device of claim 1 wherein the plurality of point markers include at least four point markers graduatedly spaced from the top end.

8. The device of claim 7 wherein each point marker has a corresponding indicia for volume.

9. The device of claim 8 wherein the indicia represent 2 oz., 3 oz., 4 oz., 5 oz., 6 oz. and 7 oz. fluid levels.

* * * * *